US012523101B2

(12) United States Patent
Xin et al.

(10) Patent No.: US 12,523,101 B2
(45) Date of Patent: Jan. 13, 2026

(54) ROTATION ANGLE CONTROL AND BRAKING DEVICE FOR POWER HEAD OF DIRECTIONAL DRILL (71) Applicant: CCTEG ChongQing Research Institute Co., Ltd., ChongQing (CN)

(72) Inventors: Dezhong Xin, ChongQing (CN); Hang Chen, ChongQing (CN); Xiaohua Liu, ChongQing (CN); Jun Wan, ChongQing (CN); Yuqing Xiao, ChongQing (CN); Jinjun Lv, ChongQing (CN); Jian Pu, ChongQing (CN); Min Tang, ChongQing (CN); Shizhai Zhang, ChongQing (CN); Zhengang Ma, ChongQing (CN); Yuan Wan, ChongQing (CN); Xin Dou, ChongQing (CN); Yi Qin, ChongQing (CN); Fujia Zhou, ChongQing (CN); Xing Wang, ChongQing (CN); Shiping Lu, ChongQing (CN); Keyu Chen, ChongQing (CN); Yange Yang, ChongQing (CN); Shitao Zhang, ChongQing (CN)

(73) Assignee: CCTEG ChongQing Research Institute Co., Ltd., ChongQing (CN)

( * ) Notice: Subject to any disclaimer, the term of this patent is extended or adjusted under 35 U.S.C. 154(b) by 0 days.

(21) Appl. No.: 18/875,699

(22) PCT Filed: May 28, 2024

(86) PCT No.: PCT/CN2024/095626
§ 371 (c)(1),
(2) Date: Jul. 9, 2025

(87) PCT Pub. No.: WO2025/044336
PCT Pub. Date: Mar. 6, 2025

(65) Prior Publication Data
US 2025/0320781 A1    Oct. 16, 2025

(30) Foreign Application Priority Data

Aug. 28, 2023   (CN) .................. 202311093067.X (51) Int. Cl.
*E21B 7/04* (2006.01)
*E21B 3/02* (2006.01)

(52) U.S. Cl.
CPC . *E21B 7/04* (2013.01); *E21B 3/02* (2013.01)

(58) Field of Classification Search
CPC .............. E21B 7/04; E21B 7/06; E21B 7/067
See application file for complete search history.

(56) References Cited

U.S. PATENT DOCUMENTS

| 4,077,657 | A | * | 3/1978 | Trzeciak | ................. | E21B 7/067 |
| | | | | | | 175/320 |
| 5,094,305 | A | * | 3/1992 | Wenzel | .................. | E21B 7/067 |
| | | | | | | 175/74 |

(Continued)

FOREIGN PATENT DOCUMENTS

| CN | 103061669 A | 4/2013 |
| CN | 214403436 U | 10/2021 |

(Continued)

OTHER PUBLICATIONS

International Search Report of PCT/CN2024/095626, published on Jul. 28, 2024.

(Continued)

*Primary Examiner* — David Carroll
(74) *Attorney, Agent, or Firm* — Wang Law Firm, Inc.

(57) ABSTRACT

The invention relates to a rotation angle control and braking device for a power head of a directional drill, belonging to the technical field of coal mine drills. It includes a transmission shaft, driving piston, fixed toothed disk, moving toothed disk, end cover, rotary seat, connecting seat, and a rotary speed reducer with a self-locking function. One end (Continued)

of the transmission shaft is fixedly connected to the drill's driving shaft. The fixed and moving toothed disks are sheathed on the transmission shaft, with springs placed between the moving toothed disk and the end cover. Skewed teeth between the disks engage under spring action. By injecting oil into a sealing cavity between the connecting seat and driving piston, the driving piston moves the moving toothed disk to disengage the skewed teeth. The rotary seat, fixed to the moving toothed disk, connects to the rotary speed reducer's output disk, enabling controlled rotation.

9 Claims, 8 Drawing Sheets

(56) References Cited

U.S. PATENT DOCUMENTS

| | | | | |
|---|---|---|---|---|
| 9,797,197 | B1* | 10/2017 | Eddy | E21B 7/067 |
| 2011/0259645 | A1* | 10/2011 | Tulloch | E21B 7/06 |
| | | | | 175/320 |
| 2013/0213713 | A1* | 8/2013 | Smith | E21B 7/06 |
| | | | | 175/45 |
| 2021/0207469 | A1* | 7/2021 | Nash | E21B 7/04 |
| 2025/0305364 | A1* | 10/2025 | Wang | E21B 3/02 |

FOREIGN PATENT DOCUMENTS

| | | |
|---|---|---|
| CN | 116892365 A | 10/2023 |
| CN | 116905958 A | 10/2023 |
| CN | 116927662 A | 10/2023 |
| CN | 117027627 A | 11/2023 |
| CN | 117027628 A | 11/2023 |
| CN | 220415256 U | 1/2024 |
| CN | 220451754 U | 2/2024 |
| CN | 220469778 U | 2/2024 |
| CN | 220487492 U | 2/2024 |
| CN | 220668202 U | 3/2024 |
| IN | 201741018089 A | 11/2018 |

OTHER PUBLICATIONS

Written Opinion of PCT/CN2024/095626, published on Jul. 28, 2024.
The claims of PCT/CN2024/095626.

* cited by examiner

ROTATION ANGLE CONTROL AND BRAKING DEVICE FOR POWER HEAD OF DIRECTIONAL DRILL

TECHNICAL FIELD

The present invention belongs to the technical field of coal mine drills, and relates to a rotation angle control and braking device for a power head of a directional drill.

BACKGROUND

During directional drilling by a directional drill, it is usually necessary to adjust a toolface azimuth to change a drilling track direction. Power heads of existing directional drills are basically the same as those of traditional drills, and no device capable of accurately controlling a rotation angle is provided. Adjustment of the toolface azimuth is driven by a drilling rotary motor with a high rotation speed; and in addition, a power head transmission system has a large inertia, which results in a poor control accuracy and a low adjustment efficiency. An existing directional drill usually has only one (or one set of) motor(s), i.e., a main motor which drives a main shaft to rotate, so that the main motor is also used to drive the main shaft to rotate during toolface azimuth adjustment. In a drilling process, a plurality of drill pipes are certainly in thread connection in a hole, so that only the main motor can be used to drive a main shaft and the drill pipes to rotate forward during toolface azimuth adjustment, and reverse rotation is likely to loosen the thread connection of the drill pipes in the hole, resulting in a bit drop accident. According to a requirement of coal mine drilling speed, the drill pipes are driven by the main motor to rotate at a high speed, and even at a low speed of as high as about 50 r/min (300°/s), so the adjustment accuracy of the system is very low. In addition, the power head transmission system (a main shaft, a gear, etc.) has a large mass and a large inertia, and usually cannot be accurately stopped when toolface azimuth adjustment is completed. Once a preset azimuth is missed, about one circle of forward rotation must be conducted for readjustment, and the process is repeated, resulting in that the adjustment efficiency is very low and not accurate enough.

A Chinese patent with the publication number of CN103061669B is a typical representative of the prior art, which discloses a large through hole power head of a coal mine directional drill with a braking function. The key is that the large through hole power head comprises a motor, a gearbox, a main shaft, a shaft I and a chuck, wherein the motor is connected with the main shaft through the gearbox, the shaft I is engaged with the main shaft through a gear in the gearbox, the chuck is arranged at a front end of the main shaft, a support ring is installed on a rear end of the main shaft, an oil distribution sleeve is sheathed on the main shaft, the shaft I is connected with a brake through the gearbox, and the brake adopts a wet friction disk structure; a dial of the brake is connected with the shaft I of the power head through a spline, active friction plates are connected with a fork claw of the dial, passive friction plates are connected with an end cover shaft fixed on a brake end cover through the spline, the brake is provided with a piston rod, 6 piston rod springs which are distributed circumferentially and uniformly are sheathed on the piston rod, a front end of the piston rod is provided with a pressure disk, a front end of the pressure disk is provided with 6 active friction plates and 5 passive friction plates layered on top of each other, a tail end of the piston rod is pressed against a front end of the end cover shaft, a pressure cap is arranged in a slot hole in the front end of the end cover shaft, and a shaft end spring is arranged at a bottom of the pressure cap; the front end of the end cover shaft is provided with a locking nut; and a drainage port of the motor is connected with a lower oil port of a shell of the brake, oil flows back to an oil tank through an upper oil port of the shell of the brake, and the piston rod springs are closely matched with the piston rod. Thus, the large through hole power head of a coal mine directional drill has a main shaft braking function, and can simultaneously satisfy two technological processes, i.e., rotary drilling and directional drilling with a downhole motor. However, the large through hole power head of a coal mine directional drill is not provided a device which can accurately control a rotation angle of a toolface azimuth, and a spindle motor is still needed to adjust the rotation angle of the toolface azimuth, so that the toolface azimuth cannot be adjusted accurately; in addition, a brake device thereof has a single function, does not have an angle adjustment function, and adopts a mode of a traditional friction plate, which comprises numerous internal vulnerable parts and requires to replace the parts frequently for maintenance, resulting in relatively difficult maintenance in later operation.

SUMMARY

In view of this, the purpose of the present invention is to provide a rotation angle control and braking device for a power head of a directional drill to solve the problem that a toolface azimuth cannot be adjusted accurately during existing directional drilling.

To achieve the above purpose, the present invention provides the following technical solution:

A rotation angle control and braking device for a power head of a directional drill has a key of comprising a transmission shaft, a driving piston, a fixed toothed disk, a moving toothed disk, an end cover, a rotary seat, a connecting seat and a rotary speed reducer with a self-locking function; one end of the transmission shaft is circumferentially and fixedly connected with a driving shaft of a main motor in the power head of the directional drill, and the other end is rotatably connected into the end cover; the driving piston, the fixed toothed disk and the moving toothed disk are sheathed on the transmission shaft, and the driving piston is located at one end of the transmission shaft close to the driving shaft; one end of the driving piston away from the driving shaft is connected with the moving toothed disk; the fixed toothed disk is circumferentially and fixedly connected with the transmission shaft; and the fixed toothed disk is located between the driving piston and the moving toothed disk.

The moving toothed disk is a disk-like part with a central through hole; the central through hole is a stepped through hole; one side of the stepped through hole facing the end cover is a large-diameter through hole; the moving toothed disk is sheathed on and slidably connected with the end cover through the large-diameter through hole; one end surface of the moving toothed disk facing the driving piston is provided with first skewed teeth distributed circumferentially; the fixed toothed disk is provided with second skewed teeth engaged with the first skewed teeth; and springs are arranged between an inner end surface of the large-diameter through hole and one end surface of the end cover opposite to the inner end surface to make the first skewed teeth and the second skewed teeth engaged under a thrust force of the springs.

An outer circular surface of the moving toothed disk is provided with lug bosses distributed uniformly; the rotary seat is sheathed on the moving toothed disk and has grooves matched with the lug bosses to be circumferentially and fixedly connected with the moving toothed disk; and one end of the rotary seat is provided with a rotary speed reducer connecting disk which is fixedly connected with an output disk of the rotary speed reducer to transfer rotation of the output disk of the rotary speed reducer to the moving toothed disk.

The connecting seat is sheathed on the driving piston; an outer circle of the connecting seat is divided by three diameters; a middle section has a largest diameter; both end surfaces of the middle section are connected with the power head of the directional drill and the rotary speed reducer, respectively, to realize relative axial positioning among the power head of the directional drill, the connecting seat and the rotary speed reducer; an inner diameter of the connecting seat is divided by three apertures, wherein the apertures of two sections away from the power head of the directional drill are matched with an outer diameter of the driving piston, and the two sections are sheathed on the driving piston; and the output disk of the rotary speed reducer is coaxial with the rotary seat.

The driving piston is a two-stage stepped shaft; a sealing groove is formed in an outer circle of a small-diameter end of the driving piston; a sealing ring is installed in the sealing groove and is matched with a corresponding position of the connecting seat sheathed on the driving piston to form a first seal; an outer circle of a large-diameter end is matched with a sealing ring installed at a corresponding position of the connecting seat to form a second seal; a sealing cavity located between the driving piston and the connecting seat is formed between the first seal and the second seal; and an oil inlet communicated with the sealing cavity is arranged on the connecting seat to enable the driving piston to push the moving toothed disk towards the end cover under an action of hydraulic oil.

Further, a transmission piston is also arranged between the driving piston and the moving toothed disk; the transmission piston is sheathed on and slidably connected with the transmission shaft; one end of the transmission piston is connected with the driving piston; and the other end is connected with the moving toothed disk to transmit a thrust force of the driving piston.

Further, the rotary seat is cylindrical, and one end of the rotary seat away from the rotary speed reducer connecting disk is provided with an end cover connecting disk which is fixedly connected with the end cover.

Further, the fixed toothed disk is provided with a toothed disk and a fixed shaft located in a center of the toothed disk; the second skewed teeth are arranged on the toothed disk; the fixed shaft is inserted into the central through hole of the moving toothed disk; and a keyway is arranged in the fixed shaft to enable the fixed toothed disk to be circumferentially and fixedly connected with the transmission shaft through key connection.

Further, the rotary speed reducer is a worm and gear rotary speed reducer with a self-locking function.

Further, the transmission shaft and the driving shaft are splined.

Further, the end cover has a three-stage stepped hollow disk-like structure, which is sheathed on the transmission shaft through a bearing; a maximum outer diameter section of the end cover is provided with a flange which is connected with the rotary seat; the maximum outer diameter section is located on one end away from the driving shaft; an intermediate diameter section is used for carrying the rotary seat and limiting an axial movement distance of the moving toothed disk; a minimum diameter section is axially and slidably connected with the large-diameter through hole of the moving toothed disk; and one end surface of the minimum diameter section is provided with a plurality of spring mounting holes which are used for mounting the springs and distributed circumferentially and uniformly.

Further, the driving shaft is arranged in a gearbox in the power head of the directional drill; one end surface of the middle section of the connecting seat is connected with the gearbox; one section of the connecting seat close to the gearbox is inserted into the gearbox and is used as an axial stop of the bearing sheathed on the driving shaft; and one section of the connecting seat close to the rotary speed reducer is extended towards an inner part of the rotary speed reducer for installation and guidance of the rotary speed reducer.

Further, the small-diameter end of the driving piston is an end close to the driving shaft.

The present invention has the following beneficial effects:

The rotation angle control and braking device for the power head of the directional drill provided by the present invention has the functions of accurate adjustment of toolface azimuths and locking and anti-rotation of the driving shaft. Thus, the toolface azimuth is adjusted accurately and efficiently, and rebounding and rotation of a main shaft of the power head caused by elastic deformation of drill pipes can be prevented, which solves the problems of lack of a special toolface azimuth adjustment device, low precision and low efficiency of track adjustment, and difficulty in realizing automatic directional drilling in the prior art. At the same time, a driving force required for toolface azimuth adjustment is greatly reduced, a good energy saving effect is achieved, the structure of a rotary braking device of the main motor is simplified, and the functions of a large number of internal parts are transferred to an external rotary speed reducer without the need of a large number of friction plates, which greatly reduces difficulty of maintenance, and reduces consumption of wearing parts.

Secondly, the present invention preferably uses the worm and gear rotary speed reducer with the self-locking function. A transmission ratio of an existing worm and gear rotary speed reducer can reach greater than 1:100, but the main shaft driven by the main motor in the prior art has a minimum rotation speed of 50 r/min (300°/s). An output rotation speed of the main shaft can be controlled to be within $\frac{1}{100}$ (≤3°/s) of the prior art by the rotation angle control and braking device through the worm and gear rotary speed reducer, which will be very conducive to accurate adjustment and timely stop, and greatly improve toolface azimuth adjustment accuracy and adjustment efficiency.

Other advantages, objectives and features of the present invention will be illustrated in the following description to some extent, and will be apparent to those skilled in the art based on the following investigation and research to some extent, or can be taught from the practice of the present invention. The objectives and other advantages of the present invention can be realized and obtained through the following description.

DESCRIPTION OF DRAWINGS

To enable the purpose, the technical solution and the advantages of the present invention to be more clear, the present invention will be preferably described in detail below in combination with the drawings, wherein.

Reference signs: 1—transmission shaft, 2—driving piston, 201—sealing groove, 202—outer circle of large-diameter end, 3—rotary speed reducer, 4—transmission piston, 5—fixed toothed disk, 501—toothed disk, 502—fixed shaft, 6—moving toothed disk, 601—lug boss, 602—first skewed tooth, 7—end cover, 701—maximum outer diameter section, 702—intermediate diameter section, 703—minimum diameter section, 704—spring mounting hole, 8—bearing gland, 9—spring, 10—rotary seat, 1001—rotary speed reducer connecting disk, 1002—end cover connecting disk, 1003—groove, 11—flat key, 12—connecting seat, 1201—left section, 1202—middle section, 1203—right section, 1204—left inner section, 1205—middle inner section, 1206—right inner section, 13—driving shaft, 14—gearbox, 15—main motor.

DETAILED DESCRIPTION

Embodiments of the present invention are described below through specific embodiments. Those skilled in the art can understand other advantages and effects of the present invention easily through the disclosure of the description. The present invention can also be implemented or applied through additional different specific embodiments. All details in the description can be modified or changed based on different perspectives and applications without departing from the spirit of the present invention. It should be noted that the figures provided in the following embodiments only exemplarily explain the basic conception of the present invention, and if there is no conflict, the following embodiments and the features in the embodiments can be mutually combined.

Wherein the drawings are only used for exemplary description, are only schematic diagrams rather than physical diagrams, and shall not be understood as a limitation to the present invention. In order to better illustrate the embodiments of the present invention, some components in the drawings may be omitted, scaled up or scaled down, and do not reflect actual product sizes. It should be understandable for those skilled in the art that some well-known structures and description thereof in the drawings may be omitted.

Same or similar reference numerals in the drawings of the embodiments of the present invention refer to same or similar components. It should be understood in the description of the present invention that terms such as "upper", "lower", "left", "right", "front" and "back" indicate direction or position relationships shown based on the drawings, and are only intended to facilitate the description of the present invention and the simplification of the description rather than to indicate or imply that the indicated device or element must have a specific direction or constructed and operated in a specific direction, and therefore, the terms describing position relationships in the drawings are only used for exemplary description and shall not be understood as a limitation to the present invention; for those ordinary skilled in the art, the meanings of the above terms may be understood according to specific conditions.

As shown in FIG. 1 to FIG. 8, a rotation angle control and braking device for a power head of a directional drill comprises a transmission shaft 1, a rotary seat 10, a connecting seat 12, a bearing gland 8 and springs 9; a driving piston 2, a transmission piston 4, a fixed toothed disk 5, a moving toothed disk 6 and an end cover 7 which are sheathed on the transmission shaft 1 from left to right in sequence; and a rotary speed reducer 3 with a self-locking function. A transmission ratio of the rotary speed reducer 3 is greater than that of the gearbox 14 in the power head of the directional drill. A left end of the transmission shaft 1 is provided with a spline which is inserted into a driving shaft 13 of a main motor 15 in the power head of the directional drill, and the driving shaft 13 is provided with a keyway matched with the spline on the transmission shaft 1, thus to make the transmission shaft 1 form a spline connection with the driving shaft 13 and then form a circumferential and fixed connection; a right end of the transmission shaft 1 is connected with the fixed toothed disk 5 sheathed on the transmission shaft 1 through a flat key 11 to form a circumferential and fixed connection, and is rotationally connected in the end cover 7 through a bearing; the end cover 7 is located on one side of the fixed toothed disk 5 away from the driving shaft 13, and located on a right side of the fixed toothed disk 5; distance sleeves are arranged on both sides of the bearing; and the bearing gland 8 which is fixedly connected by bolts is arranged on one side of the end cover 7 away from the fixed toothed disk 5, to position the bearing.

Figure 2:
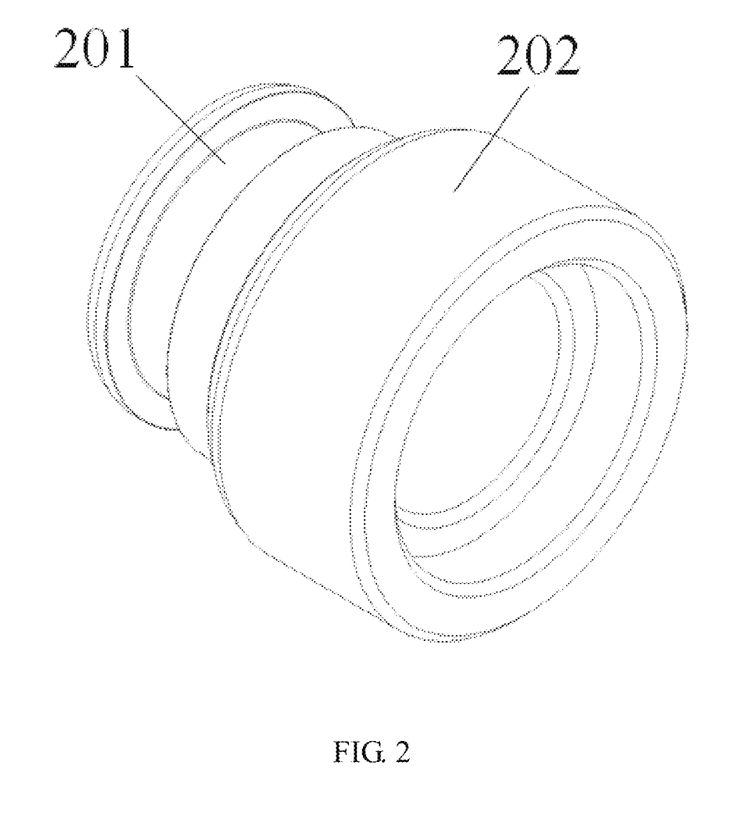
FIG. 2 is a structural schematic diagram of a driving piston in the present invention.

The driving piston 2 is a hollow two-stage stepped shaft and is sheathed on the transmission shaft 1; a sealing groove 201 is formed in an outer circle of a small-diameter end; a sealing ring is installed in the sealing groove 201 and is matched with an inner hole in a corresponding position of the connecting seat 12 sheathed on the driving piston to form a first seal; an outer circle 202 of a large-diameter end is matched with a sealing ring installed in a sealing ring mounting groove in a corresponding position of the connecting seat 9 to form a second seal; a sealing cavity Y located between the driving piston 2 and the connecting seat 12 is formed in the first seal and the second seal; an oil inlet communicated with the sealing cavity Y is arranged on the connecting seat 12; hydraulic oil enters the sealing cavity Y through the oil inlet on the connecting seat 12 to push the driving piston 2 to move from the small-diameter end to the large-diameter end; and the small-diameter end of the driving piston 2 is an end close to the driving shaft 13.

Preferably, a two-stage stepped inner hole is formed in the driving piston 2, one side facing the end cover 7 is a large-diameter inner hole, and the transmission shaft 1 is correspondingly provided with a shaft shoulder matched with the two-stage stepped inner hole to limit a displacement distance of the driving piston 2 in an axial direction.

Figure 1:
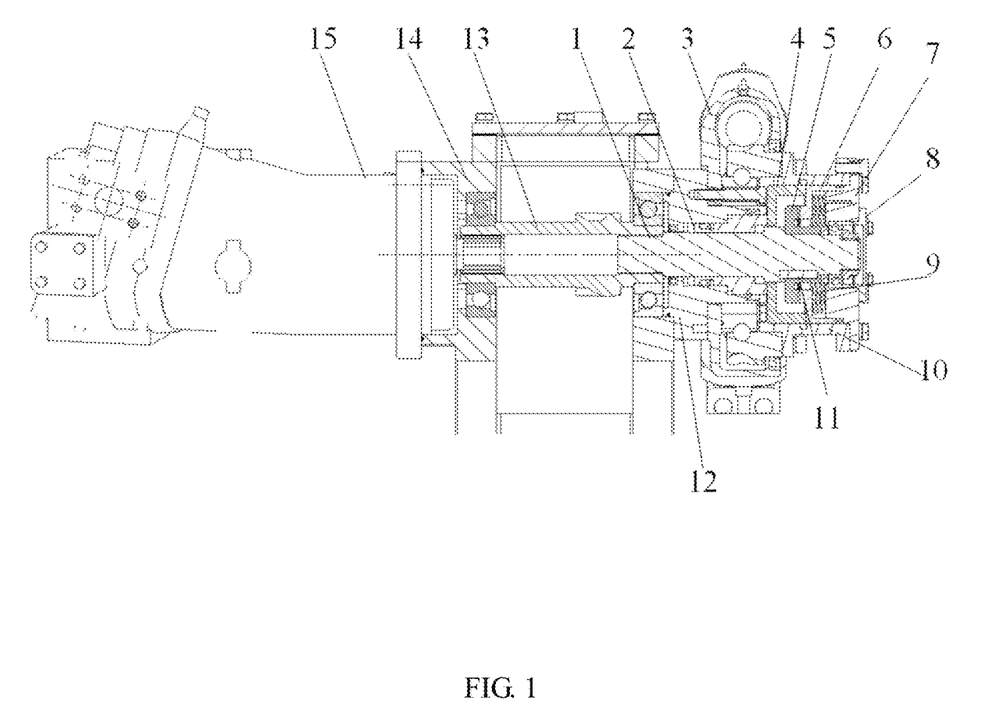
FIG. 1 is a structural schematic diagram of a rotation angle control and braking device for a power head of a directional drill in the present invention.

The transmission piston 4 is a disk-like part with a central through hole and is sheathed on the transmission shaft 1; a left end of the transmission piston 4 is in contact and connected with the large-diameter end of the driving piston 4; a right end of the transmission piston 4 is in contact and connected with the moving toothed disk 6; and a main function of the transmission piston 4 is to transfer a driving force of the driving piston 2 (the driving force of displacement to the right end) to the moving toothed disk 6, to make the moving toothed disk 6 move towards the right end in FIG. 1.

Figure 3:
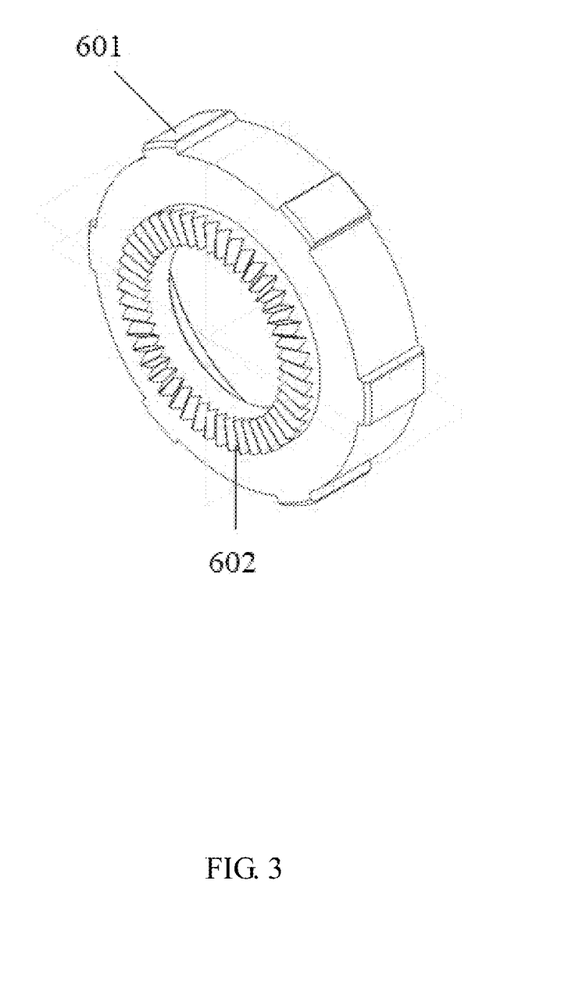
FIG. 3 is a structural schematic diagram of a moving toothed disk in the present invention.

A main body of the moving toothed disk 6 is a disk-like part with a central through hole; a stepped through hole is formed in the middle for the transmission shaft 1 and a fixed shaft 502 of the fixed toothed disk 5 to pass through; one side of the through hole facing the end cover is a large-diameter through hole; an inner end surface of the large-diameter through hole is used for withstanding an end thrust force of the springs 9; one end surface of the moving toothed disk 6 facing one side of the transmission piston 4 is provided with first skewed teeth 602 distributed circumferentially; an outer circular surface is provided with lug bosses 601 distributed uniformly; and the lug bosses 601 are matched with grooves 1003 in an inner hole of the rotary seat 10, to transfer rotation of the rotary speed reducer 3 connected with the rotary seat 10.

Figure 4:
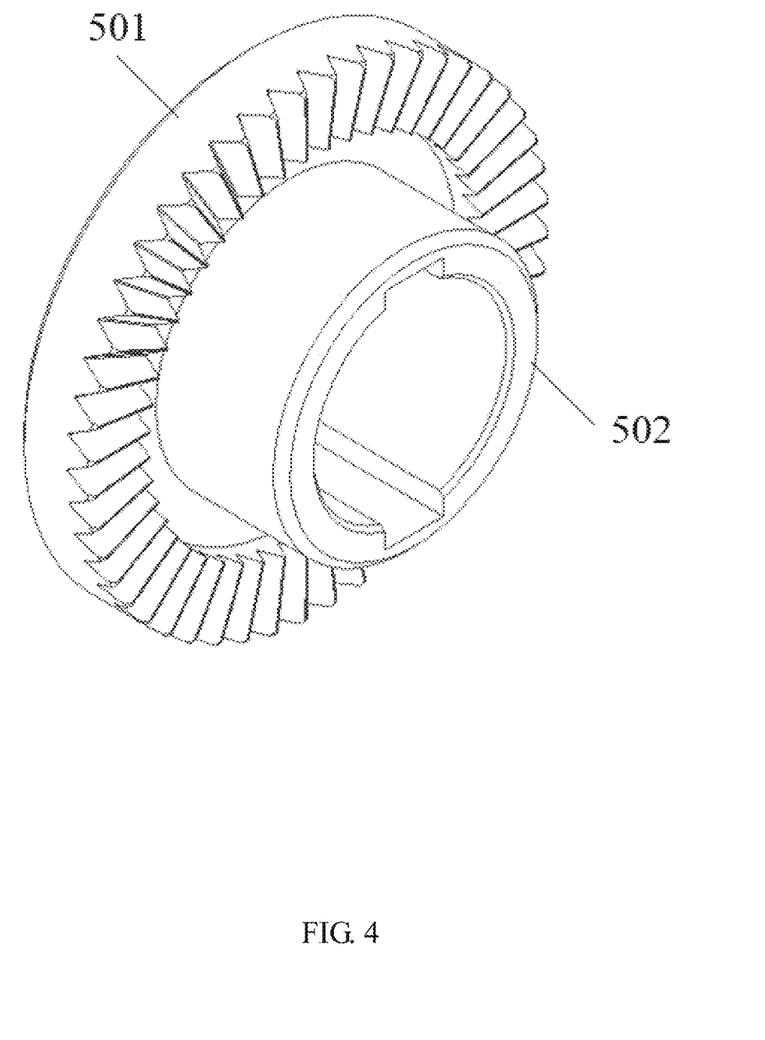
FIG. 4 is a structural schematic diagram of a fixed toothed disk in the present invention.

The fixed toothed disk 5 is provided with a toothed disk 501 and the fixed shaft 502 located in a center of the toothed disk 501; the fixed shaft 502 is a hollow shaft; an inner through hole is provided with a keyway which can form a key connection between the fixed toothed disk 5 and the transmission shaft 1, thus to realize a circumferential and fixed connection to limit rotation between the fixed toothed disk 5 and the transmission shaft 1; and one end surface of the toothed disk 501 facing the moving toothed disk 6 is provided with second skewed teeth which are engaged correspondingly with the first skewed teeth 602 of the moving toothed disk 6 and distributed circumferentially. Specifically, the fixed toothed disk 5 is fixed on the transmission shaft 1 through the flat key 11 to prevent relative rotation of the fixed toothed disk 5 and the transmission shaft 1. Both ends of the fixed toothed disk 5 are axially stopped by the shaft shoulder of the transmission shaft 1, the distance sleeves, etc.

Figure 5:
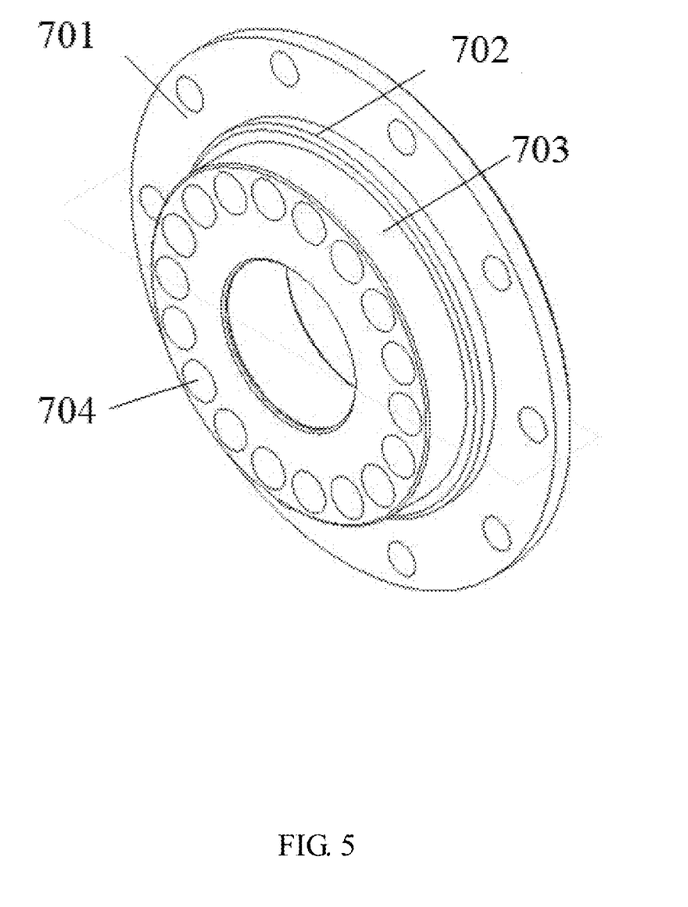
FIG. 5 is a structural schematic diagram of an end cover in the present invention.

A main body of the end cover 7 has a three-stage stepped hollow disk-like structure, which is sheathed on the transmission shaft 1 through a bearing; a maximum outer diameter section 701 is provided with a flange which is connected with the rotary seat 10 sheathed on the moving toothed disk 6 and a flange which is connected with the bearing gland 8, respectively; an intermediate diameter section 702 is used for matching with the rotary seat 10 for installation and limiting an axial movement distance of the moving toothed disk 6; a minimum diameter section 703 is used for matching with the moving toothed disk 6 for installation, i.e., the large-diameter through hole in the moving toothed disk 6 is matched with an outer circle of the minimum diameter section 703 to form an axial sliding connection; one end surface of the minimum diameter section 703 is provided with a plurality of spring mounting holes 704 which are used for mounting the springs 9 and distributed circumferentially and uniformly, wherein the minimum diameter section 703 is one end of the end cover 7 close to the driving shaft 13; and the bearing gland 8 is fixed on an outer side of the end cover 7 by bolts and used for axially limiting the bearing. The springs 9 are installed between the end cover 7 and the moving toothed disk 6 through the mounting holes 704 to provide a thrust force for the moving toothed disk 6 towards the fixed toothed disk 5.

Figure 6:
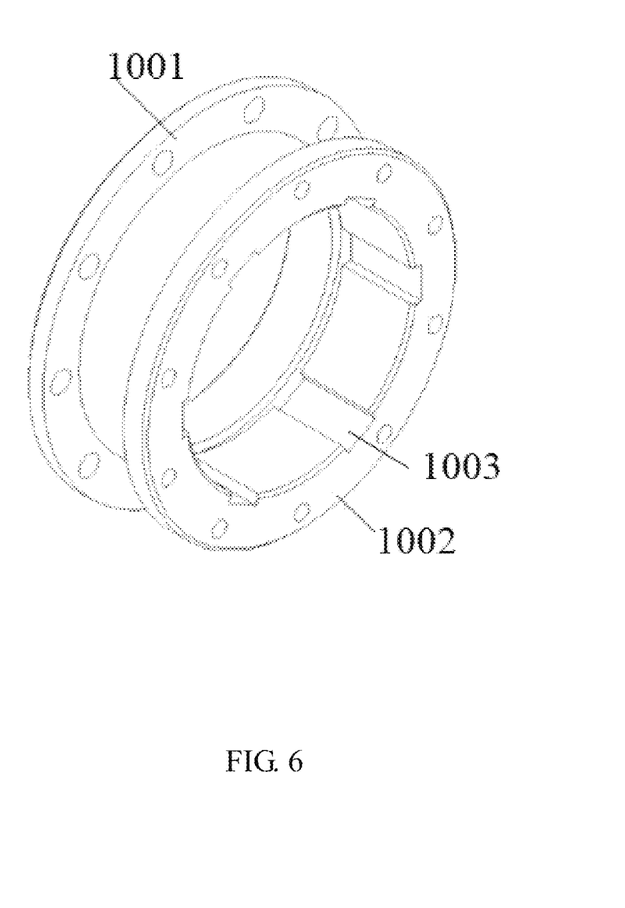
FIG. 6 is a structural schematic diagram of a rotary seat in the present invention.

A main body of the rotary seat 10 is cylindrical, which is sheathed on an outer side of the moving toothed disk 6; a left end of the rotary seat 10 is provided with a rotary speed reducer connecting disk 1001 which is used for connecting an output disk of the rotary speed reducer 3 with a self-locking function; and a right end is provided with an end cover connecting disk 1002 which is used for installing the end cover 7 and matched and connected with the intermediate diameter section 702 in the end cover 7 to leave a space for mounting the moving toothed disk 6; the rotary seat 10 has a through hole in an inner part and grooves 1003 corresponding to the lug bosses 601 of the moving toothed disk 6, a circumferential and fixed connection is formed between the rotary seat 10 and the moving toothed disk 6 by the lug bosses 601 and the grooves 1003, and the moving toothed disk 6 can be axially displaced relative to the rotary seat 10.

Figure 7:
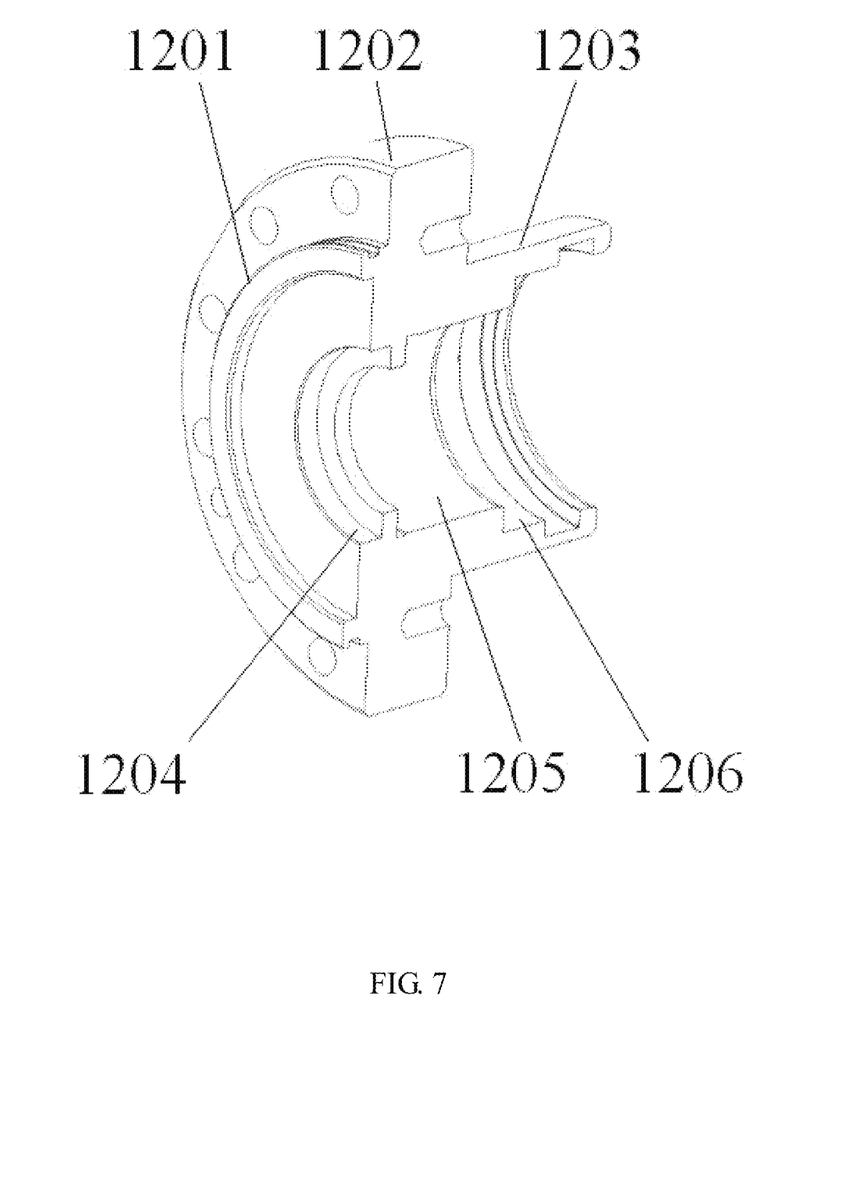
FIG. 7 is a structural schematic diagram of a connecting seat in the present invention.
Figure 8:
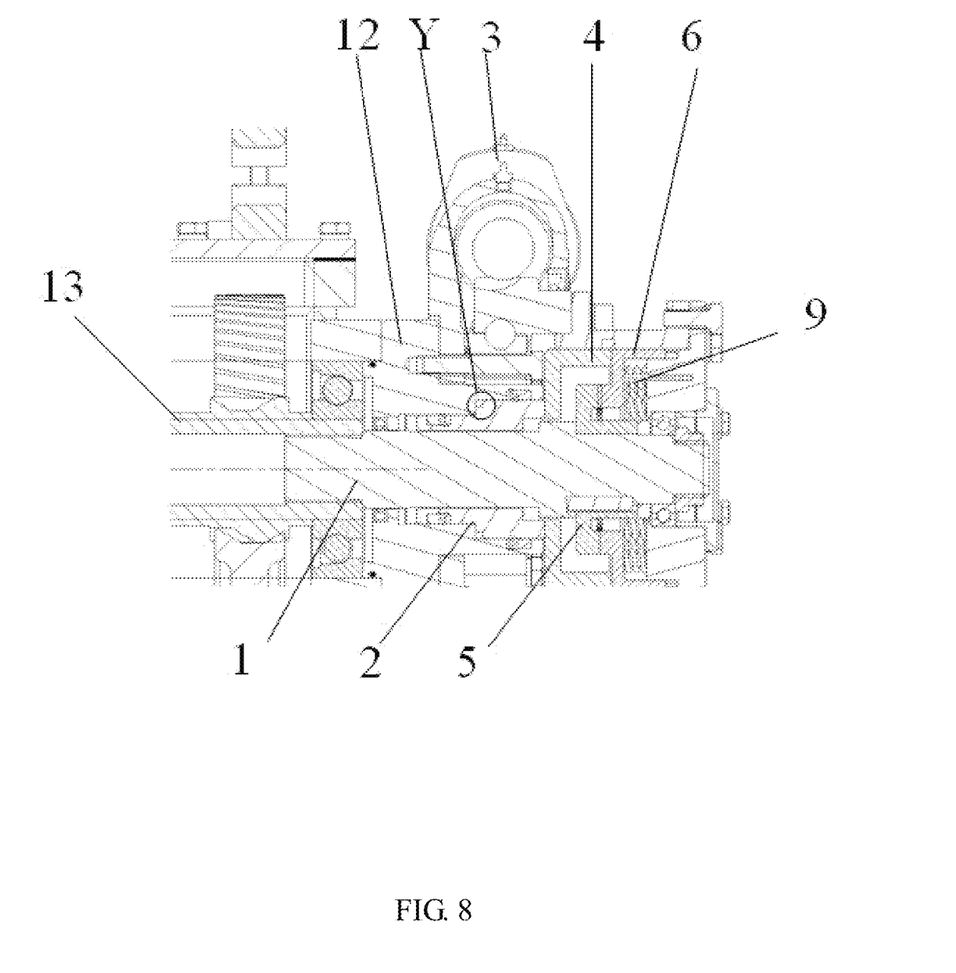
FIG. 8 is a local enlarged view of FIG. 1.

The connecting seat 12 is used for connecting the rotation angle control and braking device with the gearbox 14 in the power head of the directional drill; the gearbox 14 is sheathed on the driving shaft 13 and is mainly used for transferring torque and rotation of the driving shaft 13 to a main shaft or drill pipes; the connecting seat 12 is a hollow cylinder; an outer circle of the connecting seat 12 is divided by three diameters, wherein a middle section 1202 has a largest diameter to form a middle bulge; both end surfaces of the middle section 1202 are fitted and fixedly connected with the gearbox 14 and the rotary speed reducer 3, respectively, to realize relative axial positioning among the three elements, wherein a left section 1201 (an end close to the driving shaft 13) is inserted into a cavity of the gearbox 14 and is connected with a bearing sheathed on the driving shaft 13 to be used as an axial stop of the bearing sheathed on the driving shaft 13; a sealing groove is formed in the left section to seal the cavity of the gearbox 14 by installing a sealing ring; and a right section 1203 is extended towards an inner part of the rotary speed reducer 3 to facilitate installation and guidance of the rotary speed reducer 3.

An inner diameter of the connecting seat 12 is also divided by three apertures, wherein an inner diameter of a left inner section 1204 is matched with the transmission shaft 1 and has a sealing groove to conduct secondary sealing to the gearbox 14 by installing a sealing ring; a middle inner section 1205 and a right inner section 1206 are matched with outer diameters of the two-stage stepped shaft of the driving piston 2, respectively; the right inner section 1206 has a sealing ring mounting groove and is provided with a sealing ring, i.e., the middle inner section 1205 and the right inner section 1206 are matched with the outer circle of the small-diameter end and the outer circle 202 of the large-diameter end of the driving piston 2, respectively, to form the first seal and the second seal respectively, so as to form the sealing cavity Y, wherein a sealing groove 201 corresponding to the middle inner section 1205 and provided with the sealing ring is formed in the driving piston 2 to form the first seal; the right inner section 1206 has a sealing groove and is provided with a sealing ring matched with the outer circle 202 of the large-diameter end to from the second seal; the sealing cavity Y located between the connecting seat 12 and the driving piston 2 is formed by the first seal and the second seal; the oil inlet is arranged on an outer surface of the connecting seat 12 in a position corresponding to the sealing cavity Y; and hydraulic oil enters the sealing cavity Y through the oil inlet on the connecting seat 12 to push the driving piston 2 to move from the right end, thus to push the transmission piston 4 and the moving toothed disk 6, and further compress the springs 9 by the moving toothed disk 6, thereby disengaging the skewed teeth of the moving toothed disk 6 and the fixed toothed disk 5.

The rotary speed reducer 3 is sheathed on the right section 1203 of the connecting seat 12 and is fixedly connected with the middle section 1202 of the connecting seat 12, and the output disk (such as the toothed disk or a worm gear) of the rotary speed reducer 3 is fixedly connected with the rotary seat 10 by bolts, so as to limit relative rotation of the output disk of the rotary speed reducer 3 and the rotary seat 10. The rotary speed reducer 3 mainly has two functions: the first is to drive the driving shaft 13 by the transmission shaft 1 to rotate at a relatively low speed (compared with being driven by the main motor 15), and transfer the rotation by the gearbox 14 to accurately control an output rotation angle. The second is to prevent the main motor 15 from driving the driving shaft 13 to rotate, thus to realize locking and anti-rotation of the whole gearbox 14 in a locked condition because the rotary speed reducer 3 has a self-locking action and a self-locking torque of the rotary speed reducer 3 is greater than the output torque of the main motor 15.

Preferably, the rotary speed reducer 3 is a worm and gear rotary speed reducer with a self-locking function, i.e., the rotary speed reducer connecting disk 1001 is connected with a worm gear which is used as the output disk in the worm and gear rotary speed reducer, and the worm gear is sheathed on the transmission shaft 1 through the connecting seat 12 and the driving piston 2, so as to ensure synchronous rotation of the worm gear and the rotary seat 10. A transmission ratio of an existing worm and gear rotary speed reducer can reach greater than 1:100, but the main shaft driven by the main motor 15 in the prior art (the main shaft is driven by the gearbox 14) has a minimum rotation speed of at least 50 r/min (300°/s), and therefore, an output rotation speed of the main shaft can be controlled to be within ⅟₁₀₀ (≤3°/s) of the prior art by the rotation angle control and braking device through the worm and gear rotary speed reducer, which will be very conducive to accurate adjustment and timely stop, and greatly improve toolface azimuth adjustment accuracy and adjustment efficiency.

Specifically, the worm and gear rotary speed reducer comprises a driving source, a worm, a worm gear and a rotary support; the rotary support is sheathed on and fixedly connected with the connecting seat by bolts; the worm gear is rotationally connected with an outer circle of the rotary support through a raceway and is matched and connected with the worm, so as to achieve a purpose of making the output disk (i.e., the worm gear) of the rotary speed reducer coaxial with the rotary seat; and the driving source is connected with one end of the worm to drive the worm to rotate. As worm and gear transmission has a characteristic of reverse self-locking and can realize reverse self-locking, i.e., the worm gear can only be driven by the worm, but the worm cannot be driven by the worm gear to move, the worm and gear rotary speed reducer has the self-locking function. The driving source is an electric motor or a hydraulic motor, and is preferred to be a hydraulic motor in the present embodiment in order to be suitable for complex coal mine downhole operations.

In other embodiments, the rotary speed reducer is any one of the rotary speed reducers such as an RV speed reducer and a harmonic speed reducer, and a structure used as the output disk (or called a rotary disk) in the above-mentioned rotary speed reducer 3 is also fixedly connected with the rotary seat 10.

The rotation angle control and braking device for the power head of the directional drill has two working conditions, and a working principle thereof is as follows:

Locked condition: no pressure oil enters the sealing cavity Y formed between the driving piston 2 and the connecting seat 12 from the oil inlet of the connecting seat 12; the rotation angle control and braking device is not driven by externally supplied pressure oil; and an axial force towards the fixed toothed disk 5 is always exerted by the springs 9 onto the moving toothed disk 6 to keep the skewed teeth of the moving toothed disk 6 engaged with the skewed teeth of the fixed toothed disk 5; at this time, the main motor 15 and the driving shaft 13 are connected with the rotary speed reducer 3 through the transmission shaft 1, the fixed toothed disk 5, the moving toothed disk 6 and the rotary seat 10, and the rotary speed reducer 3 has a self-locking function within a working capacity thereof (i.e., the self-locking torque of the rotary speed reducer 3 is greater than the output torque of the main motor 15), to form a locking action on a transmission system of the gearbox 14; the main motor 15 cannot transfer motion through the gearbox 14; however, if the rotary speed reducer 3 is driven at this time, the driving shaft 13 can be driven by the rotary speed reducer 3 to rotate at a relatively low speed (compared with being driven by the main motor), and the rotation and torque are transferred by the gearbox 14 to accurately control a rotation angle of the main shaft and the drill pipes, so as to conduct accurate and efficient adjustment to the toolface azimuth.

Unlocked condition: pressure oil is injected into the sealing cavity Y between the driving piston 2 and the connecting seat 12 through the oil inlet of the connecting seat 12; the driving piston 2 is driven by a hydraulic force to push the transmission piston 4 and the moving toothed disk 6 to move in a direction away from the fixed toothed disk 5; at this time, the springs 9 are compressed by the moving toothed disk 6 and retracted; the skewed teeth of the moving toothed disk 6 and the fixed toothed disk 5 are disengaged; and the self-locking action of the rotary speed reducer 3 cannot be transferred to the transmission shaft 1, the driving shaft 13 and the main motor 15. Therefore, the driving shaft 13 can be driven by the main motor 15 to rotate, thus to output rotation and torque by the gearbox 14.

Finally, it should be noted that the above embodiments are only used for describing, rather than limiting the technical solution of the present invention. Although the present invention is described in detail with reference to the preferred embodiments, those ordinary skilled in the art shall understand that the technical solution of the present invention can be amended or equivalently replaced without departing from the purpose and the scope of the technical solution. The amendment or equivalent replacement shall be covered within the scope of the claims of the present invention.

What is claimed is:

1. A rotation angle control and braking device for a power head of a directional drill, characterized by comprising a transmission shaft, a driving piston, a fixed toothed disk, a moving toothed disk, an end cover, a rotary seat, a connecting seat and a rotary speed reducer with a self-locking function; one end of the transmission shaft is circumferentially and fixedly connected with a driving shaft of a main motor in the power head of the directional drill, and an other end is rotatably connected into the end cover; the driving piston, the fixed toothed disk and the moving toothed disk are sheathed on the transmission shaft, and the driving piston is located at one end of the transmission shaft close to the driving shaft; one end of the driving piston away from the driving shaft is connected with the moving toothed disk; the fixed toothed disk is circumferentially and fixedly connected with the transmission shaft; and the fixed toothed disk is located between the driving piston and the moving toothed disk;

the moving toothed disk is a disk-like part with a central through hole; the central through hole is a stepped through hole; one side of the stepped through hole facing the end cover is a large-diameter through hole;

the moving toothed disk is sheathed on and slidably connected with the end cover through the large-diameter through hole; one end surface of the moving toothed disk facing the driving piston is provided with first skewed teeth distributed circumferentially; the fixed toothed disk is provided with second skewed teeth engaged with the first skewed teeth; and springs are arranged between an inner end surface of the large-diameter through hole and one end surface of the end cover opposite to the inner end surface to make the first skewed teeth and the second skewed teeth engaged under a thrust force of the springs;

an outer circular surface of the moving toothed disk is provided with lug bosses distributed uniformly; the rotary seat is sheathed on the moving toothed disk and has grooves matched with the lug bosses to be circumferentially and fixedly connected with the moving toothed disk; and one end of the rotary seat is provided with a rotary speed reducer connecting disk which is fixedly connected with an output disk of the rotary speed reducer to transfer rotation of the output disk of the rotary speed reducer to the moving toothed disk;

the connecting seat is sheathed on the driving piston; an outer circle of the connecting seat is divided by three diameters; a middle section has a largest diameter; both end surfaces of the middle section are connected with the power head of the directional drill and the rotary speed reducer, respectively, to realize relative axial positioning among the power head of the directional drill, the connecting seat and the rotary speed reducer; an inner diameter of the connecting seat is divided by three apertures, wherein the apertures of two sections away from the power head of the directional drill are matched with an outer diameter of the driving piston, and the two sections are sheathed on the driving piston; and the output disk of the rotary speed reducer is coaxial with the rotary seat;

the driving piston is a two-stage stepped shaft; a sealing groove is formed in an outer circle of a small-diameter end of the driving piston; a sealing ring is installed in the sealing groove and is matched with a corresponding position of the connecting seat sheathed on the driving piston to form a first seal; an outer circle of a large-diameter end is matched with a sealing ring installed at a corresponding position of the connecting seat to form a second seal; a sealing cavity located between the driving piston and the connecting seat is formed between the first seal and the second seal; and an oil inlet communicated with the sealing cavity is arranged on the connecting seat to enable the driving piston to push the moving toothed disk towards the end cover under an action of hydraulic oil.

2. The rotation angle control and braking device for the power head of the directional drill according to claim 1, characterized in that: a transmission piston is also arranged between the driving piston and the moving toothed disk; the transmission piston is sheathed on and slidably connected with the transmission shaft; one end of the transmission piston is connected with the driving piston; and an other end is connected with the moving toothed disk to transmit a thrust force of the driving piston.

3. The rotation angle control and braking device for the power head of the directional drill according to claim 1, characterized in that: the rotary seat is cylindrical, and one end of the rotary seat away from the rotary speed reducer connecting disk is provided with an end cover connecting disk which is fixedly connected with the end cover.

4. The rotation angle control and braking device for the power head of the directional drill according to claim 1, characterized in that: the fixed toothed disk is provided with a toothed disk and a fixed shaft located in a center of the toothed disk; the second skewed teeth are arranged on the toothed disk; the fixed shaft is inserted into the central through hole of the moving toothed disk; and a keyway is arranged in the fixed shaft to enable the fixed toothed disk to be circumferentially and fixedly connected with the transmission shaft through key connection.

5. The rotation angle control and braking device for the power head of the directional drill according to claim 1, characterized in that: the rotary speed reducer is a worm and gear rotary speed reducer with a self-locking function.

6. The rotation angle control and braking device for the power head of the directional drill according to claim 1, characterized in that: the transmission shaft and the driving shaft are splined.

7. The rotation angle control and braking device for the power head of the directional drill according to claim 1, characterized in that: the end cover has a three-stage stepped hollow disk-like structure, which is sheathed on the transmission shaft through a bearing; a maximum outer diameter section of the end cover is provided with a flange which is connected with the rotary seat; the maximum outer diameter section is located on one end away from the driving shaft; an intermediate diameter section is used for carrying the rotary seat and limiting an axial movement distance of the moving toothed disk; a minimum diameter section is axially and slidably connected with the large-diameter through hole of the moving toothed disk; and one end surface of the minimum diameter section is provided with a plurality of spring mounting holes which are used for mounting the springs and distributed circumferentially and uniformly.

8. The rotation angle control and braking device for the power head of the directional drill according to claim 1, characterized in that: the driving shaft is arranged in a gearbox in the power head of the directional drill; one end surface of the middle section of the connecting seat is connected with the gearbox; one section of the connecting seat close to the gearbox is inserted into the gearbox and is used as an axial stop of the bearing sheathed on the driving shaft; and one section of the connecting seat close to the rotary speed reducer is extended towards an inner part of the rotary speed reducer for installation and guidance of the rotary speed reducer.

9. The rotation angle control and braking device for the power head of the directional drill according to claim 1, characterized in that: the small-diameter end of the driving piston is an end close to the driving shaft.

* * * * *